United States Patent
Ooba

(10) Patent No.: US 11,679,502 B2
(45) Date of Patent: Jun. 20, 2023

(54) ROBOT CONTROL SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 283 days.

(21) Appl. No.: 17/013,971

(22) Filed: Sep. 8, 2020

(65) Prior Publication Data

US 2021/0094181 A1   Apr. 1, 2021

(30) Foreign Application Priority Data

Sep. 26, 2019   (JP) .............................. JP2019-174975

(51) Int. Cl.
*B25J 9/16* (2006.01)
*B25J 9/00* (2006.01)

(52) U.S. Cl.
CPC ........... *B25J 9/1666* (2013.01); *B25J 9/0093* (2013.01); *B25J 9/1674* (2013.01)

(58) Field of Classification Search
CPC ....... B25J 9/1666; B25J 9/0093; B25J 9/1674
See application file for complete search history.

(56) References Cited

U.S. PATENT DOCUMENTS

| | | | | |
|---|---|---|---|---|
| 2015/0005936 A1* | 1/2015 | Ito | ........................... | B25J 9/163 901/14 |
| 2015/0183117 A1* | 7/2015 | Oda | ........................ | B25J 15/08 414/751.1 |
| 2017/0274532 A1* | 9/2017 | Nishitani | ............... | B25J 9/1666 |
| 2018/0099419 A1* | 4/2018 | Hoshino | .................. | B25J 21/00 |
| 2018/0236665 A1* | 8/2018 | Takahashi | ............. | B25J 9/1697 |
| 2018/0336402 A1* | 11/2018 | Takahashi | ............ | G08B 13/196 |
| 2020/0064857 A1* | 2/2020 | Gagne | ................. | A47L 11/4036 |
| 2020/0156236 A1* | 5/2020 | Lager | ..................... | B25J 9/1605 |
| 2020/0188046 A1* | 6/2020 | Overmyer | ............. | A61B 34/20 |

FOREIGN PATENT DOCUMENTS

| | | |
|---|---|---|
| JP | 2002018754 A | 1/2002 |
| JP | 2002192486 A | 7/2002 |

* cited by examiner

*Primary Examiner* — Kira Nguyen

(74) *Attorney, Agent, or Firm* — Studebaker & Brackett PC

(57) ABSTRACT

To provide a robot control system that performs a process by a robot for a continuously-moving process target or a repeatedly-moving/stopped process target, the robot control system being configured so that even in a case where the robot process cannot be properly performed in the robot control system, disadvantages such as occurrence of damage of equipment can be avoided by sensing of such failure in the robot process. The robot control system includes a robot that performs a process for a process target, a control unit that controls drive of the robot, a first area setting unit that sets a first area where the process is performed for the process target, and a second area setting unit that sets a second area outside the first area such that the robot performs a retraction motion when a working apparatus provided at the robot moves out of the first area and enters the second area while the robot is following the moving process target.

6 Claims, 4 Drawing Sheets

ROBOT CONTROL SYSTEM

This application is based on and claims the benefit of priority from Japanese Patent Application No. 2019-174975, filed on 26 Sep. 2019, the content of which is incorporated herein by reference.

BACKGROUND OF THE INVENTION

Field of the Invention

The present invention relates to a robot control system.

Related Art

Typically, in a case where an industrial robot performs a process for a process target such as an article delivered on, e.g., a production line, it is important to control, with high accuracy, drive and stop (a stop position) of the robot for the delivered process target.

For example, Japanese Unexamined Patent Application, Publication No. 2002-018754 discloses a "robot apparatus that grips a relatively-moving target object, the robot apparatus including a gripping section having a gripping mechanism that grips the target object and configured such that the gripping mechanism is movable, an imaging section fixed movably together with the gripping mechanism of the gripping section to image the target object, a feature amount extraction unit that extracts the coordinates of one or more feature amounts from an image of the target object acquired by the imaging section, a storage section that stores the position of the gripping mechanism when the gripping mechanism grips the target object as a first hand-tip position, stores the position of the gripping mechanism when the gripping mechanism moves within an area where the target object can be opened and imaged by the imaging section as a second hand-tip position, and stores the coordinates of each feature amount of the target object extracted by the feature amount extraction section after imaging by the imaging section at the second hand-tip position, a calculation section that calculates a movement matrix for movement from the second hand-tip position to the first hand-tip position, a follow-up control section that moves the gripping section such that the coordinates of each feature amount of the moving target object extracted by the feature amount extraction section is coincident with the coordinates of each feature amount stored in the storage section to perform the control of causing the gripping mechanism to follow the moving target object, and a gripping control section that controls, when the gripping mechanism follows the moving target object, the gripping section such that the gripping mechanism approaches the moving target object based on the movement matrix calculated by the calculation section to grip the target object".

Japanese Unexamined Patent. Application, Publication No. 2002-192486 discloses a "robot control method for performing predetermined operation for a moving object delivered by a delivery apparatus while following the moving object, in which the moving object is detected, the position of the moving object in a coordinate system of the delivery apparatus is acquired based on a detection result, the position of the moving object is sequentially updated in the coordinate system of the delivery apparatus based on the position of the moving object and the amount of operation of the delivery apparatus, and the track of a robot for following the moving object is generated by conversion of the position of the moving object from the coordinate system of the delivery apparatus into a coordinate system of the robot".

Moreover, the inventor of the present application has devised a robot control system that includes one or more visual sensors provided at an arm of a robot, a storage unit that stores, as target data for causing the visual sensors to follow a follow-up target, a first feature amount regarding at least the position and posture of the follow-up target, a feature amount detection section that uses images acquired by the visual sensors to detect a second feature amount regarding at least the position and posture of the follow-up target, a movement amount calculation section that calculates an arm movement command based on a difference between the second feature amount and the first feature amount, and a movement command section that moves the arm based on the movement command and that controls the robot with high accuracy and causes the robot to accurately follow, e.g., an article. The applicant of the present application has already filed a patent application (Japanese Patent Application No. 2019-010335) relating to this technique.

Patent Document 1: Japanese Unexamined Patent. Application, Publication No. 2002-018754

Patent Document. 2: Japanese Unexamined Patent Application, Publication No. 2002-192486

SUMMARY OF THE INVENTION

It is conceivable that in a case where a robot performs a process while following an article moved by a delivery apparatus, the robot fails to perform the process in time.

For example, in a case where a robot assembles a door with an automobile body moving on a production line, it is necessary to insert a pin to operably attach the door. At this point, there is a probability that equipment is damaged before completion of the process by the robot due to fitting failure or biting of the pin.

For this reason, development of a method and a technique in which even in a case where a robot process cannot be properly performed in a robot control system that performs the process by a robot for a continuously-moving process target or a repeatedly-moving/stopped process target, disadvantages such as occurrence of damage of equipment can be avoided by sensing of such failure in the robot process has been strongly demanded.

One aspect of a robot control system of the present disclosure includes a robot that performs a process for a process target, a control unit that controls drive of the robot, a first area setting unit that sets a first area where the process is performed for the process target, and a second area setting unit, that sets a second area outside the first area such that the robot performs a retraction motion when a working apparatus provided at the robot moves out of the first area and enters the second area while the robot is following the moving process target.

According to one aspect of the robot control system of the present disclosure, the control unit controls drive of the robot to perform the retraction motion when the working apparatus of the robot moves out of the first area where the process is safely performed for the process target and enters the second area. With this configuration, even in a case where the process cannot be properly performed due to an unforeseen situation, the robot control system that continuously moves the robot or repeatedly moves/stops the robot to perform the process for the process target can sense such a situation, and can avoid, e.g., occurrence of damage of equipment.

DETAILED DESCRIPTION OF THE INVENTION

Hereinafter, a robot control system according to one embodiment will be described with reference to FIGS. 1 to 4. The robot control system of the present embodiment relates to, for example, a system provided on a production line to control a robot (an industrial robot) that performs a process for a delivered process target such as an article.

Figure 1:
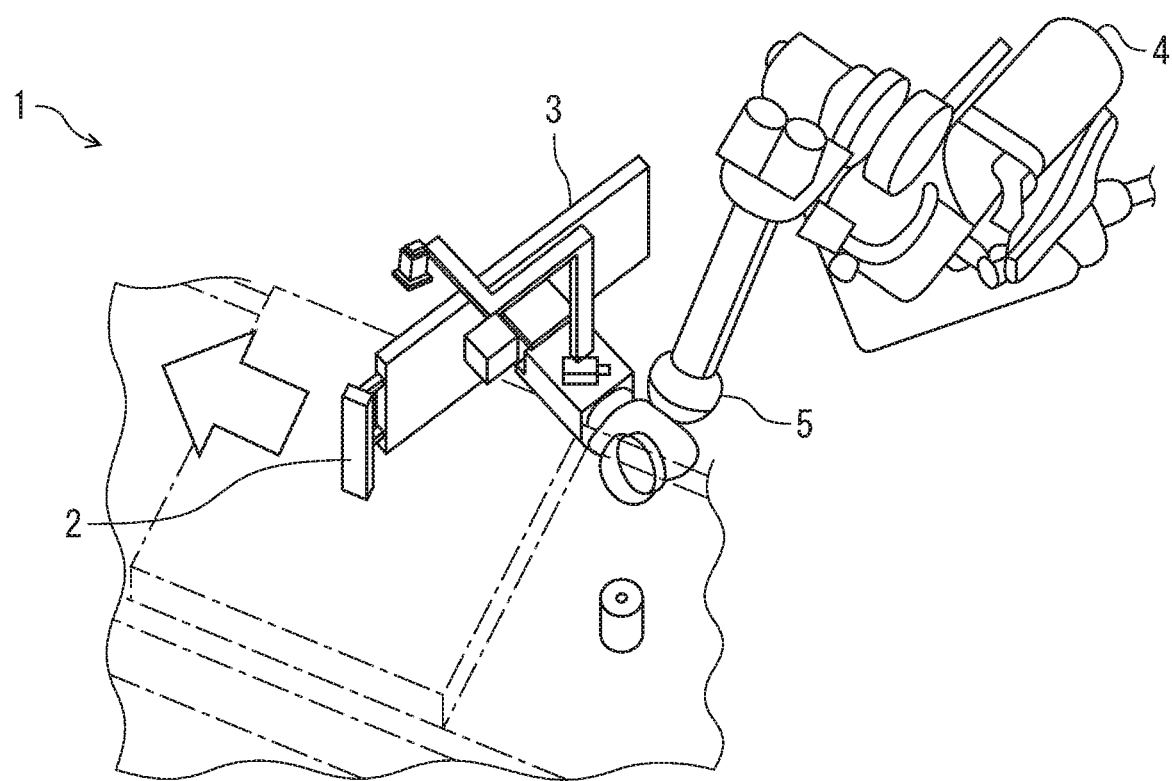
FIG. 1 is a perspective view showing a robot control system of one aspect.

Specifically, the robot control system 1 of the present embodiment includes, as shown in FIG. 1, a robot 4 that performs, e.g., the process of assembling a door 3 with the process target 2 such as an automobile body (not shown) and a control unit that controls drove of the robot 4.

The robot 4 is, for example, formed in an articulated shape, and includes one or more visual sensors provided at a movable arm and a tool (a working apparatus) 5 that is attached to the arm to perform a predetermined process for the process target 2.

The control unit controls drive of the robot 4 to perform the process for the process target 2, and based on detection results of the visual sensors, drives and controls the robot 4 such that, e.g., the tool 5 or an article gripped by the tool 5 follows the process target 2.

Figure 2:
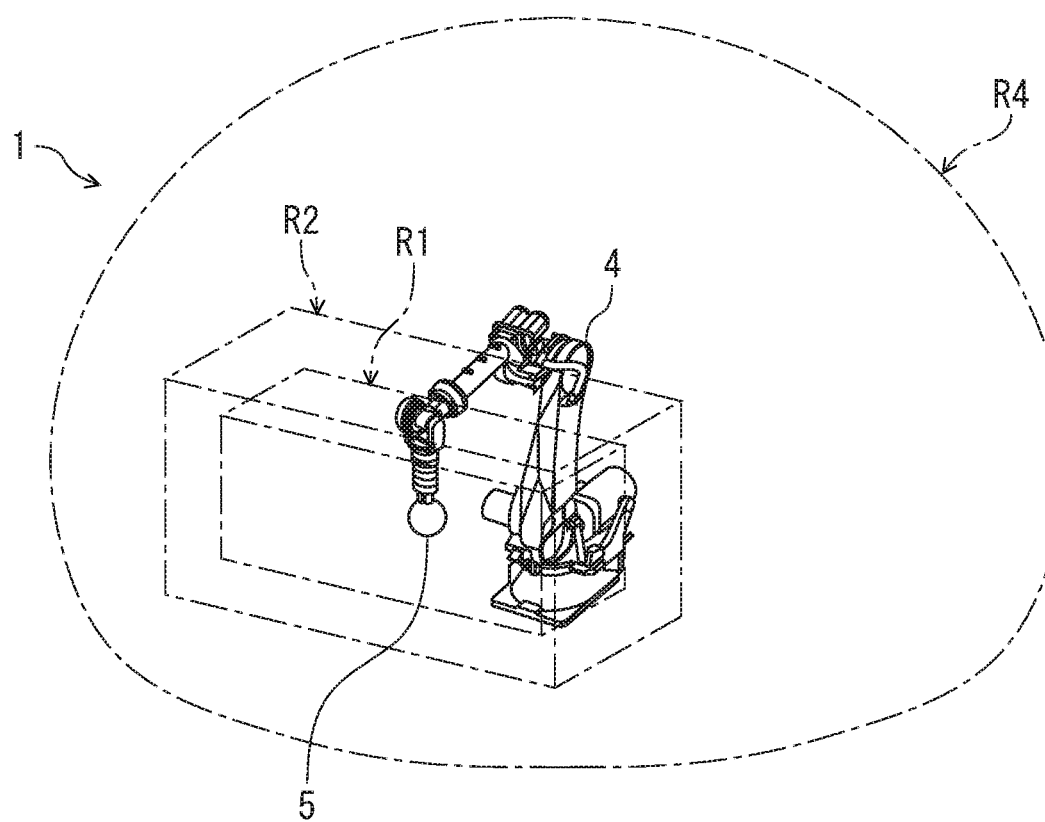
FIG. 2 is a view showing an example of a first area, a second area, and a movable area set by the robot control system of one aspect.

In addition to the robot 4 and the control unit, the robot control system 1 of the present embodiment includes, as shown in FIG. 2, an arm position checking unit that sequentially checks the position of the arm, a first area setting unit that sets a first area R1 as a working area where the process is performed for the process target 2, and a second area setting unit that sets a second area R2 outside the first area R1 as an avoidance area where the arm is safely operable such that the robot 4 performs a retraction motion when the tool 5 provided at the robot 4 moves out of the first area R1 as the working area and enters the second area R2 as the avoidance area while the robot 4 is following the process target 2 moved by, e.g., a delivery apparatus.

According to process contents, a movement direction of the process target 2, the configuration of the robot 4, etc., the positions and sizes of the first area R1 as the working area and the second area R2 as the avoidance area are set. The second area R2 as the avoidance area is a sufficient area for causing the robot 4 to perform the retraction motion, and the tool 5 of the robot 4 performs the retraction motion in the second area R2.

In an example shown in FIG. 2, a movable area R4 where the tool 5 of the robot 4 is operable is set as a large area, the small first area (working area) R1 where the robot 4 can actually perform the process is set inside the movable area R4, and the intermediate second area (avoidance area) R2 is set to include the first area R1 as the working area.

Figure 3:
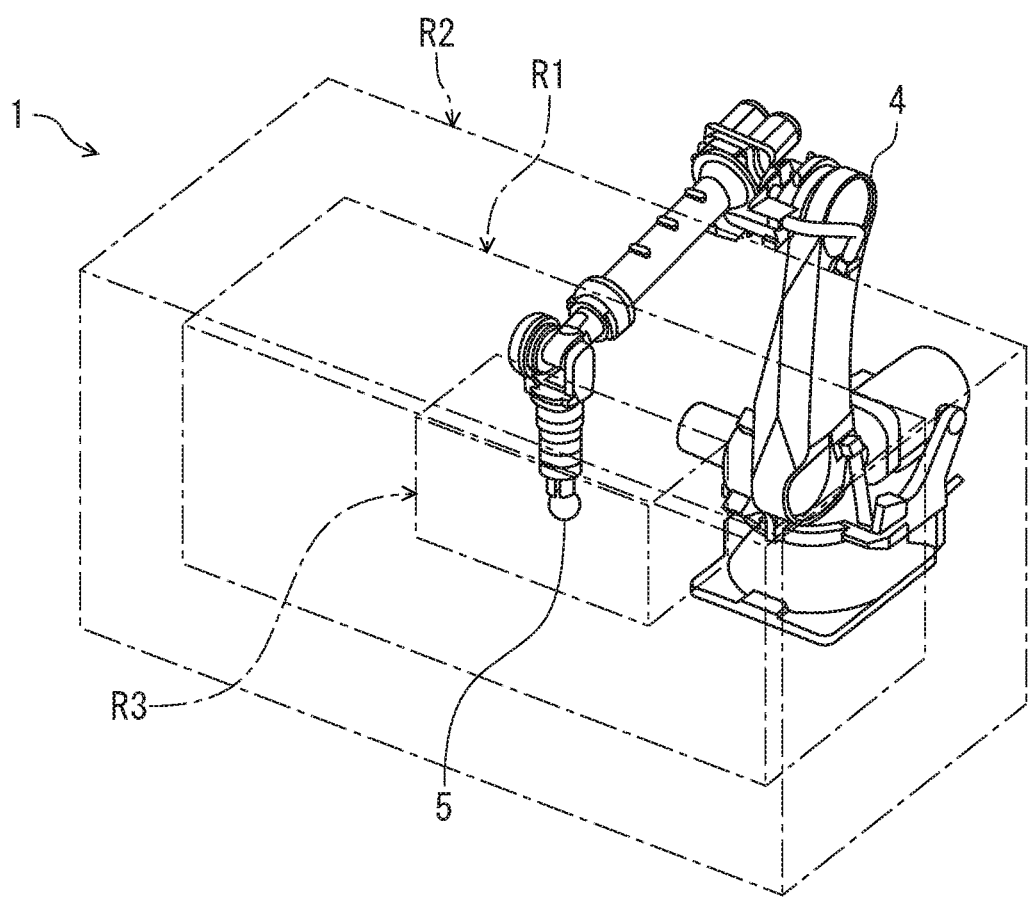
FIG. 3 is a view showing an example of the first area, the second area, and a third area set by the robot control system of one aspect.

In an example shown in FIG. 3, a portion remaining after the rectangular parallelepiped first area R1 as the working area has been removed from a rectangular parallelepiped area surrounded by the outer periphery of the second area R2 as the avoidance area is the second area R2 as the avoidance area.

Figure 4:
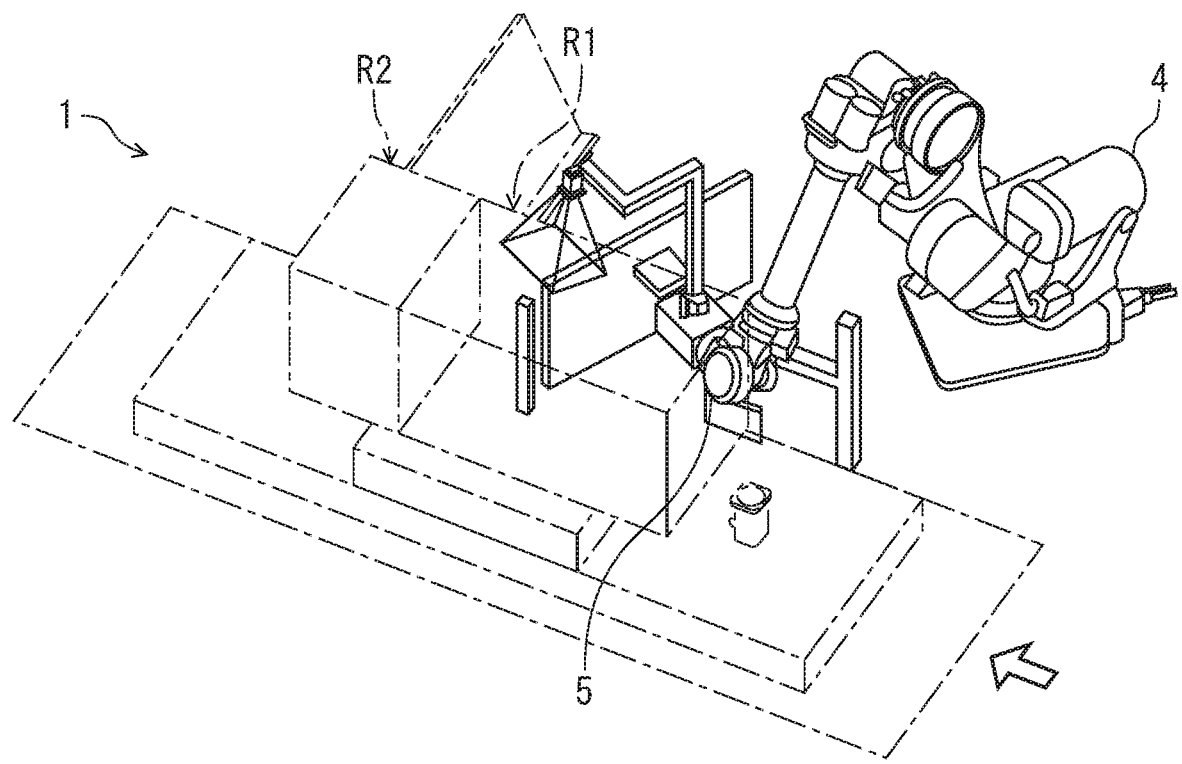
FIG. 4 is a view showing an example of the first area and the second area set by the robot control system of one aspect.

In an example shown in FIG. 4, the second area R2 as the avoidance area is, considering the movement direction of the process target 2, provided downstream of the rectangular parallelepiped first area R1 as the working area in the movement direction.

The arm position checking unit uses, as necessary, a technique such as a sensor or image acquisition.

The robot control system 1 of the present embodiment includes an abnormality processing unit that determines, as an abnormality, a situation where the tool 5 of the robot 4 moves out of the first area R1 as the working area to perform abnormality processing.

In the present embodiment, the abnormality processing unit issues, as one type of abnormality processing, a notification when the tool 5 of the robot 4 moves out of the first area R1 as the working area, thereby causing an operator to recognize occurrence of the abnormality and causing the control unit to perform drive control in the abnormality processing.

For example, when the tool 5 of the robot 4 moves out of the first area R1 as the working area and enters the second area R2 as the avoidance area, the abnormality processing unit stops movement of the process target 2 or decreases a movement speed of the process target 2 to a predetermined speed, or causes the robot 4 to perform a retraction motion while the robot 4 is continuously following the continuously-moving process target 2.

Moreover, the robot control system 1 of the present embodiment preferably includes a third area setting unit that sets a third area R3 as a process restart area inside the first area R1 as the working area, and the abnormality processing unit is preferably configured to continuously determine, in a case where the tool 5 moves out of the first area R1 as the working area and enters the second area R2 as the avoidance area, such a situation as the abnormality until the tool 5 enters the third area R3 as the process restart area.

For example, in a case where the tool 5 moves out of the first area R1 as the working area before completion of the process by the robot 4 due to fitting failure or biting of a pin in the process of assembling the door 3 with the automobile body as the process target 2 sequentially moved by the delivery apparatus by means of the robot 4, the robot control system 1 of the present embodiment configured as described above controls the robot 4 to perform the retraction motion when the tool 5 enters the second area R2 as the avoidance area.

In this case, the abnormality processing unit causes the robot 4 to perform the retraction motion while the robot 4 is continuously following the continuously-moving process target 2, or stops movement of the process target 2 or decreases the movement speed of the process target 2 to the predetermined speed such that the retraction motion of the robot 4 is suitably performed.

That is, the second area R2 as the avoidance area is mainly set for 1) stopping the delivery apparatus by some kind of signal output when the tool 5 moves out of the first area R1 as the working area to continue the process or 2) performing the retraction motion without stopping the delivery apparatus while the delivery apparatus is being fed forward.

Moreover, for the second area R2 as the avoidance area, the time necessary for performing the retraction motion with some time margin is obtained from, e.g., the movement speed of the process target 2, and the size of the area is determined based on such time.

Thus, in the robot control system 1 of the present embodiment, the control unit controls drive of the robot 4 to perform the retraction motion when the tool (the working apparatus) 5 of the robot 4 moves out of the first area R1 as the working area where the process is safely performed for the process target 2 and enters the second area R2 as the avoidance area.

Thus, according to the robot control system 1 of the present embodiment, even in a case where the process cannot be properly performed due to an unforeseen situation in the robot control system that continuously moves the robot 4 or repeatedly moves/stops the robot 4 to perform the process for the process target 2, such a situation can be sensed, and, e.g., occurrence of damage of equipment can be avoided.

In a case where the process target 2 freely moves or a case where the retraction motion of the robot 4 is complicated, the tool 5 moved out of the first area R1 as the working area into the second area R2 as the avoidance area once, might move back and forth between the second area R2 and the first area R1. If operation is switched between the process in a normal state and the process in an abnormal state every time the tool 5 moves in and out of the areas R1 and R2 as described above, control becomes complicated, and efficiency is significantly degraded.

On the other hand, in the robot control system 1 of the present embodiment, the third area R3 as the process restart area is set inside the first area R1 as the working area. With this configuration, in a case where the tool 5 moves out of the first area R1 as the working area and enters the second area R2 as the avoidance area, the abnormality processing unit continuously determines such a situation as the abnormality until the tool 5 enters the third area R3 as the process restart area. Thus, it is not necessary to switch the operation between the process in the normal state and the process in the abnormal state every time the tool 5 moves in and out of the second area R2 and the first area R1, and disadvantages such as complicated control and significant efficiency degradation can be solved.

One embodiment of the robot control system has been described above. However, the present disclosure is not limited to one embodiment described above, and change can be made as necessary without departing from the gist of the present disclosure.

EXPLANATION OF REFERENCE NUMERALS 1 robot control system
2 process target
4 robot
5 tool (working apparatus)
R1 working area (first area)
R2 avoidance area (second area)
R3 process restart area (third area)
R4 movable area

What is claimed is:

1. A robot control system comprising:
    a robot that performs a process for a process target, the process target moving relative to the robot;
    a control unit that controls drive of the robot; and
    a processor, the processor being configured to:
    set a first area where the process is performed for the process target; and
    set a second area outside the first area such that the control unit controls the robot to perform a retraction motion when a working apparatus provided at the robot moves out of the first area and enters the second area while the robot is following the moving process target.

2. The robot control system according to claim 1, wherein the processor determines a situation where the working apparatus of the robot moves out of the first area as an abnormality to perform abnormality processing.

3. The robot control system according to claim 2, wherein the processor issues a notification when the working apparatus of the robot moves out of the first area.

4. The robot control system according to claim 2, wherein when the working apparatus of the robot moves out of the first area and enters the second area, the processor stops movement of the process target or decreases a movement speed of the process target to a predetermined speed.

5. The robot control system according to claim 2, wherein when the working apparatus of the robot moves out of the first area and enters the second area, the processor causes the robot to perform the retraction motion while the robot is continuously following the continuously-moving process target.

6. The robot control system according to claim 2, wherein the processor sets a third area inside the first area, and the processor continuously determines, as the abnormality, the situation where the working apparatus moves out of the first area and enters the second area until the working apparatus enters the third area.

* * * * *